United States Patent [19]

Lin

[11] Patent Number: 6,036,308
[45] Date of Patent: Mar. 14, 2000

[54] SPECTACLES STRUCTURE

[76] Inventor: Pei-Tsung Lin, No. 11, Kuo-Chung 2nd Road, Ta Li City, Taichung Hsien, Taiwan

[21] Appl. No.: 09/294,319

[22] Filed: Apr. 20, 1999

[51] Int. Cl.⁷ .................................................... G02C 1/08
[52] U.S. Cl. ................................................ 351/90; 351/41
[58] Field of Search ................................. 351/90, 91, 92, 351/93, 95, 96, 97, 98, 99, 100, 101, 102, 41

[56] References Cited

U.S. PATENT DOCUMENTS

| 4,466,713 | 8/1984 | Tanaka ....................................... 351/90 |
| 5,917,575 | 6/1999 | Cunningham .............................. 351/90 |

*Primary Examiner*—Hung Xuan Dang
*Attorney, Agent, or Firm*—Rosenberg, Klein & Lee

[57] ABSTRACT

A spectacles structure including two outer seats, two temples, two movable rim assemblies, two inner seats and a bridge disposed between the two movable rim assemblies. The movable rim assembly includes an upper half rim and a lower half rim. One end of each of the upper and lower half rims is formed with a hook section hooked in a stopper socket of the inner seat. The other end thereof is formed with a bolted section bolted with a fixing section of the outer seat. The spectacles can be easily converted between full rim, rimless and half rim-type spectacles. Furthermore, the bridge is excellently firmly located on the inner seat so that the number of the components is reduced and the assembling operation is facilitated. Also, the replacing procedure is simplified.

6 Claims, 8 Drawing Sheets

SPECTACLES STRUCTURE

BACKGROUND OF THE INVENTION

The present invention relates to a spectacles structure which is convertible between a full rim, upper half rim, lower half rim and rimless type spectacles.

Figure 11:
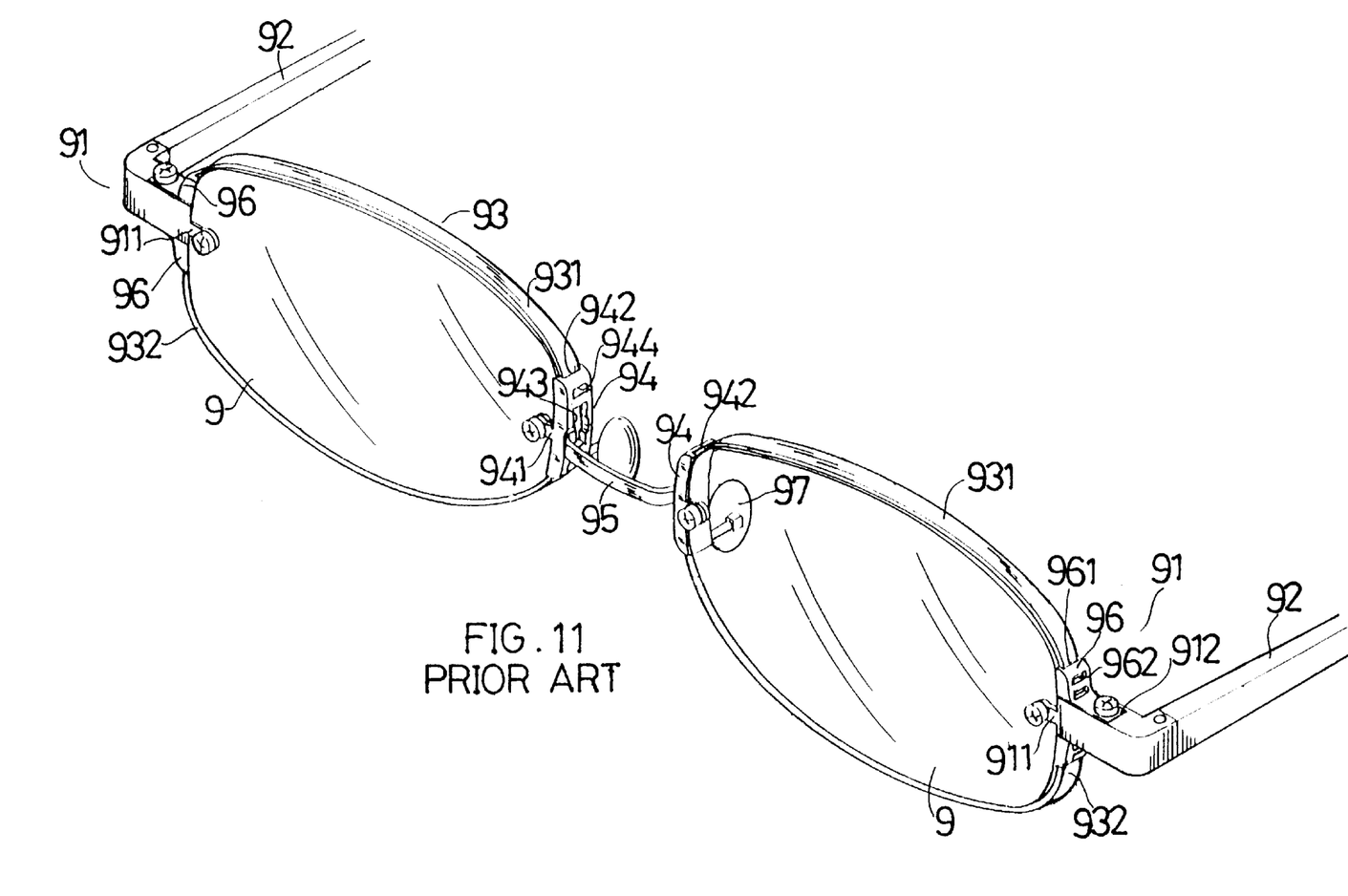
FIG. 11 is a perspective assembled view of a conventional spectacles structure.
Figure 12:
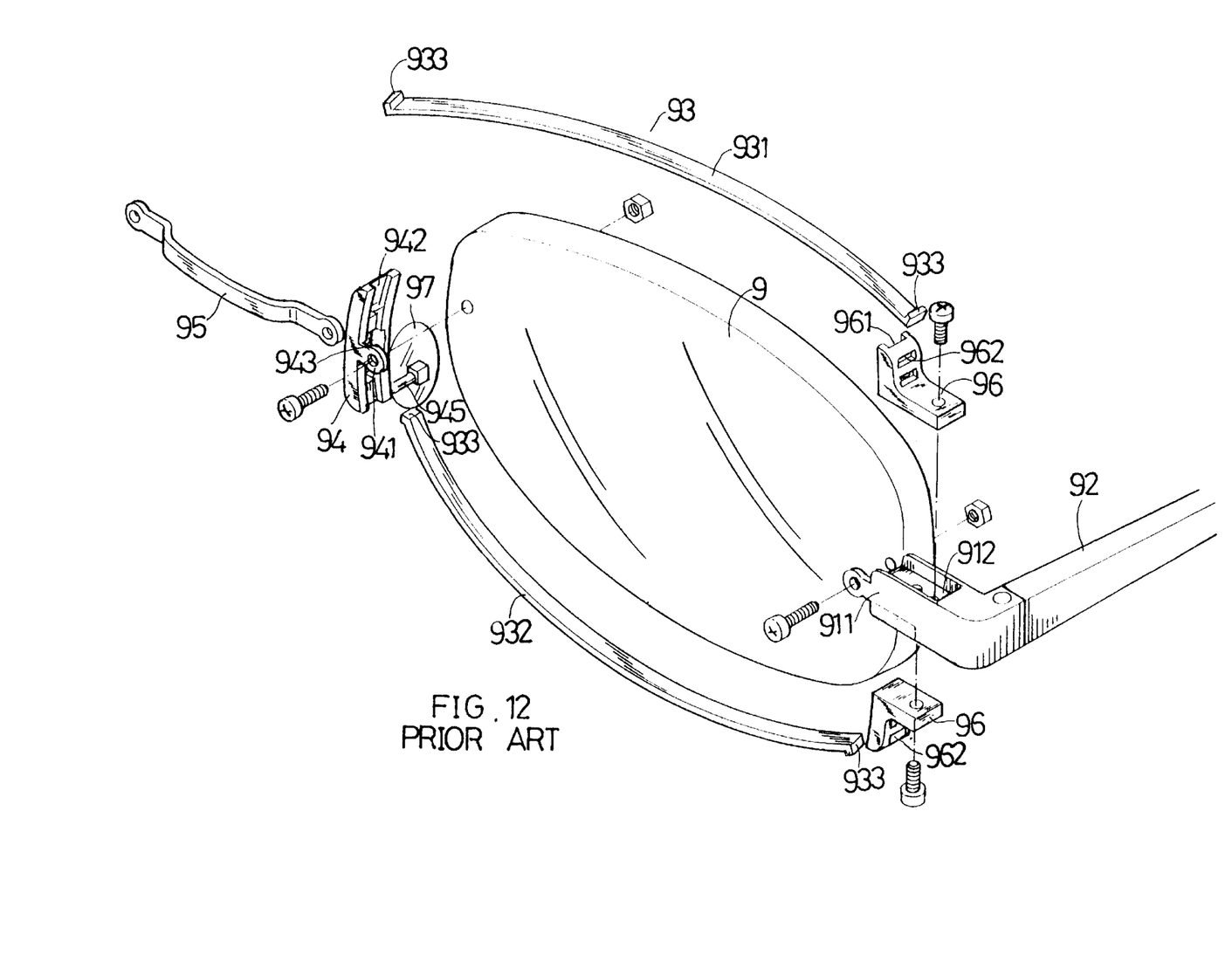
FIG. 12 is a perspective exploded view according to FIG. 11.

FIGS. 11 and 12 show a pair of prior spectacles designed by the applicant. The spectacles are convertible between full rim, upper half rim, lower half rim and rimless type so as to reduce the expense of a consumer and the stock of a glasses store. The spectacles include two lenses 9, two outer seats 91, two temples 92, two movable rim assemblies 93, two inner seats 94 and a bridge 95. A rear side of each outer seat 91 is pivotally connected with the temple 92. A front side of the outer seat 91 has a coupling section 911 bolted on outer side of each lens 9. The opposite positions of top face and bottom face of the outer seat 91 are respectively formed with two fixing recesses 912. A stopper plate 96 is fixed in each fixing recess 912 by a screw. A lateral side of the stopper plate 96 adjacent to the lens 9 is formed with a longitudinal channel 961 for attaching an inner edge of the stopper plate 96 to the lens 9. A section of the stopper plate 96 distal from the outer seat 91 is formed with a stopper socket 962.

The inner seat 94 has a coupling section 941 bolted on inner side of the lens 9 and is formed with a longitudinal channel 942 for attaching the inner edge of the inner seat 94 to the lens 9. A middle section of the longitudinal channel 942 is formed with a through hole 943. Two sides of the through hole 943 are respectively formed with two stopper sockets 944. The movable rim assembly 93 includes an upper half rim 931 and a lower half rim 932. Two ends of each the rim are respectively formed with two hook sections 933. One hook section 933 is hooked into the stopper socket 962 of the stopper plate 96, while the other hook section 933 is hooked into the stopper socket 944 of the inner seat 94. A rear side of the inner seat 94 is disposed with a nose piece arm 945 connecting with a nose piece 97. The bridge 95 passes through the through holes 943 of the inner seats 94 with two ends bolted on inner sides of the lenses 9 together with the coupling sections 941 of the inner seats 94.

According to the above arrangements, the rim of the spectacles is convertible. However, the assembly and components of such structure are complicated. Two ends of the movable rim assembly must be both hooked into the stopper sockets and then assembled. Especially, when converting the rim, the stopper plates of the outer seats must be first disassembled and then assembled. This is quite inconvenient. Furthermore, the stopper plate and the outer seat are not integrally formed so that no matter how they are fixed connected with each other, the appearance can be hardly smooth. Also, the bridge must be passed through the through holes of the inner seats. This leads to inconvenience in assembly so that the cost for such spectacles cannot be lowered.

SUMMARY OF THE INVENTION

It is therefore a primary object of the present invention to provide an improved spectacles structure in which the bolted sections of one end of a movable rim assembly is directly locked with the outer seat and the bridge is firmly located on the inner seat without relative rotation and linear displacement. Therefore, the spectacles can be easily converted between full rim, rimless and half rim-type spectacles and the number of the components is reduced and the assembling and replacing procedures are simplified.

The present invention can be best understood through the following description and accompanying drawings wherein:

DETAILED DESCRIPTION OF THE PREFERRED EMBODIMENTS

Please refer to FIGS. 1 to 10. The present invention includes two lenses 2, two outer seats 3, two temples 4, two movable rim assemblies 5, two inner seats 6 and a bridge 7. A rear side of each outer seat 3 is pivotally connected with the temple 4. A front side of the outer seat 3 has an extending coupling section 31 bolted on outer side of each lens 2. The top face and bottom face of the outer seat 3 are respectively formed with two fixing sections 32. The movable rim assembly 5 includes an upper half rim 51 and a lower half rim 52. One end of each of the upper and lower half rims 51, 52 is formed with a hook section 53, while the other end thereof is formed with a bent bolted section 54. A screw is passed through the bolted section 54 of the movable rim assembly 5 to lock the same with the fixing section 32 of the outer seat 3.

Figure 1:
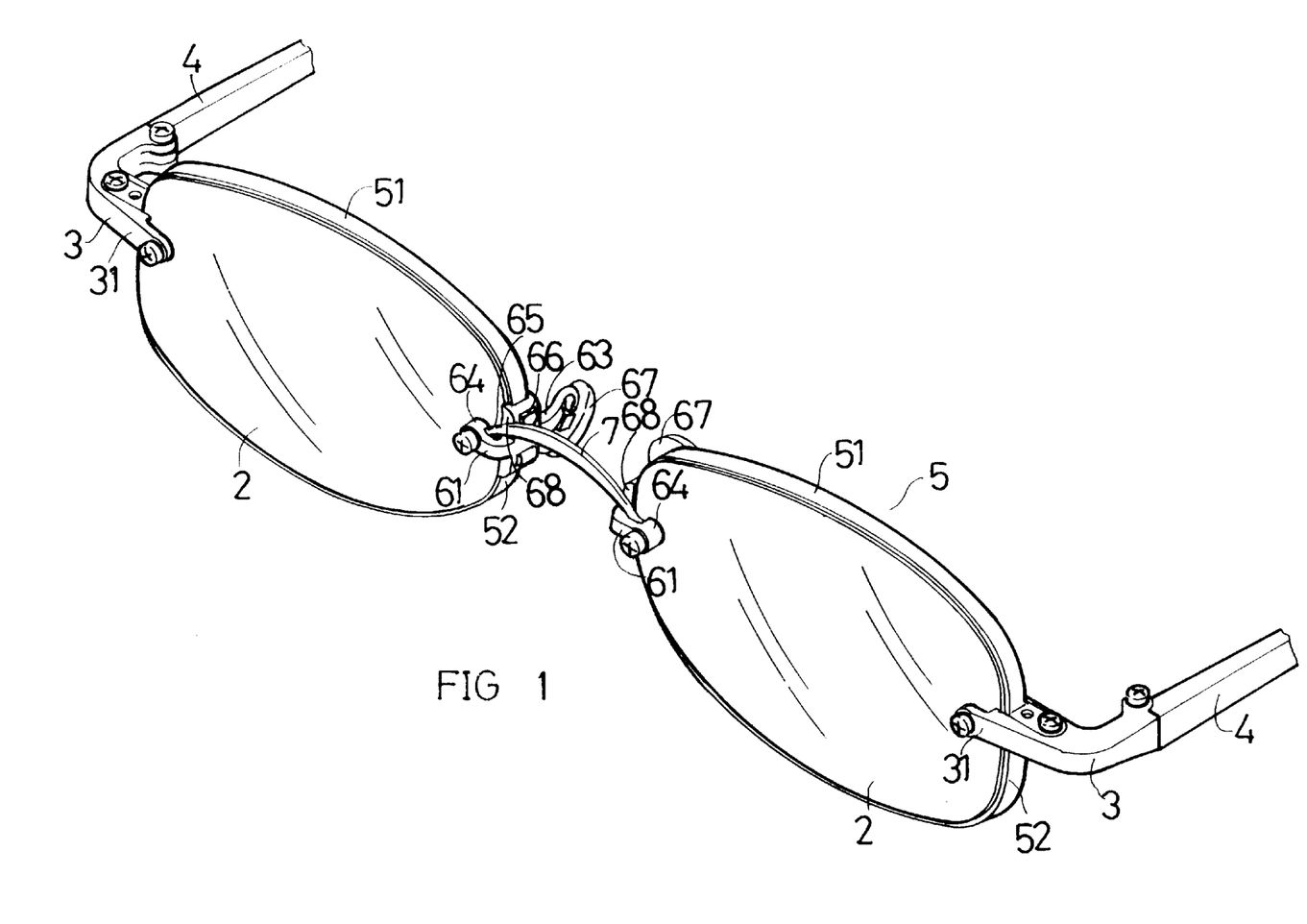
FIG. 1 is a perspective assembled view of the present invention.
Figure 2:
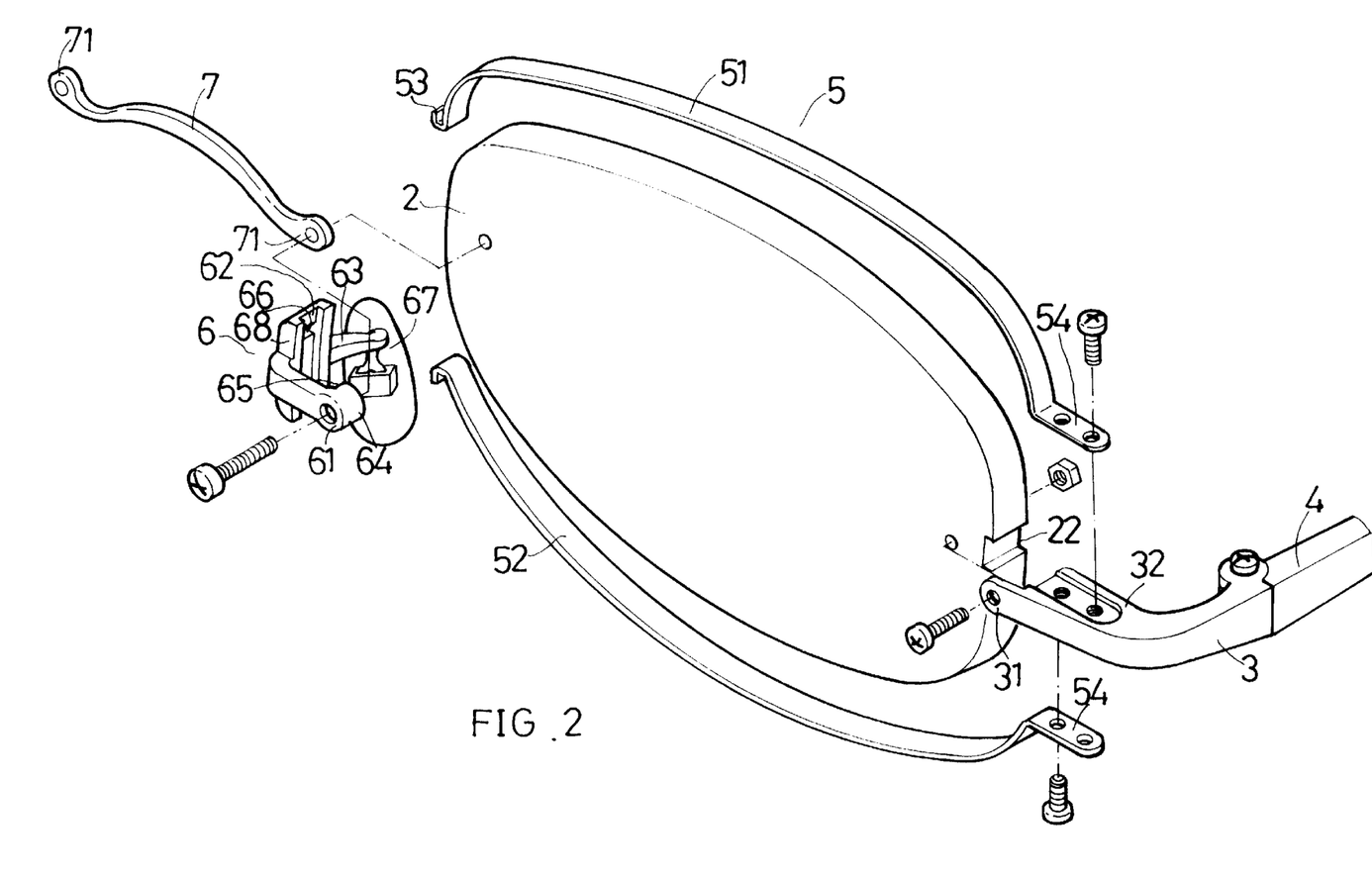
FIG. 2 is a perspective exploded view of a part of the present invention.
Figure 5:
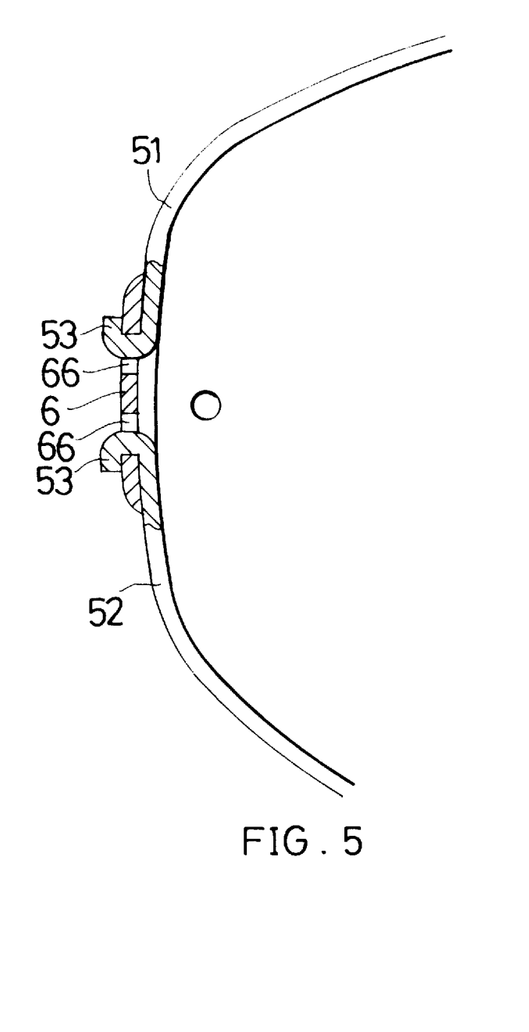
FIG. 5 is a sectional view of a part of a first embodiment of the inner seat of the present invention.

The inner seat 6 has a laterally extending coupling section 61 formed with a longitudinal channel 62 for attaching the inner edge of the inner seat 6 to the lens 2. The coupling section 61 of the inner seat 6 is bolted on inner side of the lens 2. The coupling section 61 has a ring-shaped projection 64 formed with a notch 65. The upper and lower sides of the longitudinal channel 62 are respectively formed with two rectangular stopper sockets 66. The hook sections 53 of the upper and lower half rims 51, 52 can hook the rectangular sides of the stopper sockets 66. A protuberance 68 is disposed beside the longitudinal channel 62 for abutting against the bridge 7 and avoiding interference of the bridge 7 with the lens 2. Also, the protuberance 68 increases the contacting area between the inner seat 6 and the lens 2 and prevents the inner seat 6 from rotating. In addition, a rear side of the inner seat 6 is disposed with a nose piece arm 63 connecting with a nose piece 67.

Figure 7:
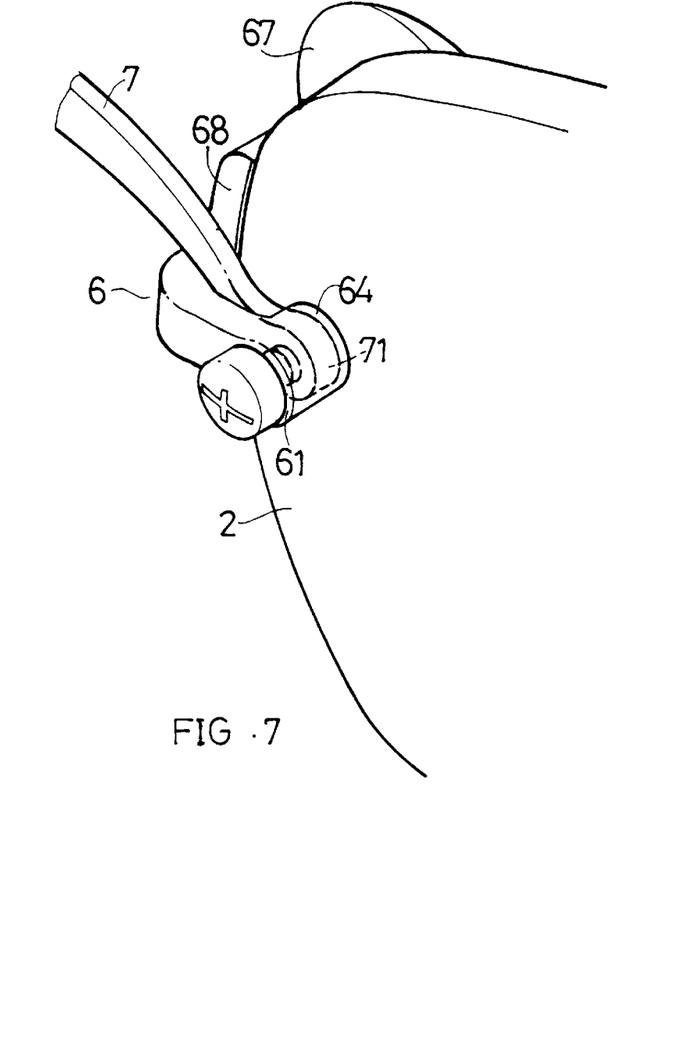
FIG. 7 is a perspective assembled view of a part of the inner seat and bridge of the present invention.
Figure 8:
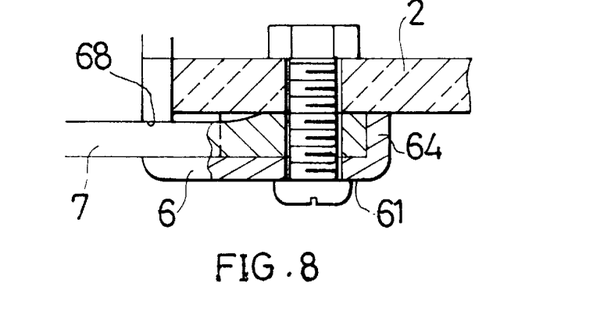
FIG. 8 is a sectional view showing a relationship between the inner seat and the bridge of the present invention.
Figure 9:
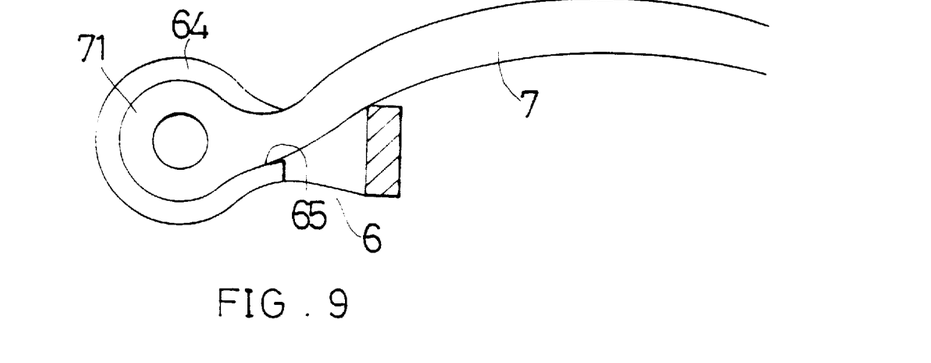
FIG. 9 is a sectional view showing another relationship between the inner seat and the bridge of the present invention.

The bridge 7 is an elongated member two ends of which are respectively formed with two locating sections 71 cooperating with the projections 64 of the inner seats 6. The notch 65 of the inner seat 6 permits the locating section 71 to be placed into the projection 64. One end of the notch 65 abuts against the bridge 7 to prevent the same from upward rotating. The upper edge of the coupling section 61 contacts with the lower edge of the bridge 7, that is, abuts against one side of the bridge 7 opposite to the side against which the notch 65 abuts. Therefore, the bridge 7 cannot be downward rotated. This provides a locating effect for avoiding relative rotation between the bridge 7 and the inner seat 6. Then the coupling section 61 and the locating section 71 are locked and bolted with a lens 2. Therefore, the inner seat 6 and the bridge 7 can be firmly locked without relative linear displacement.

Figure 3:
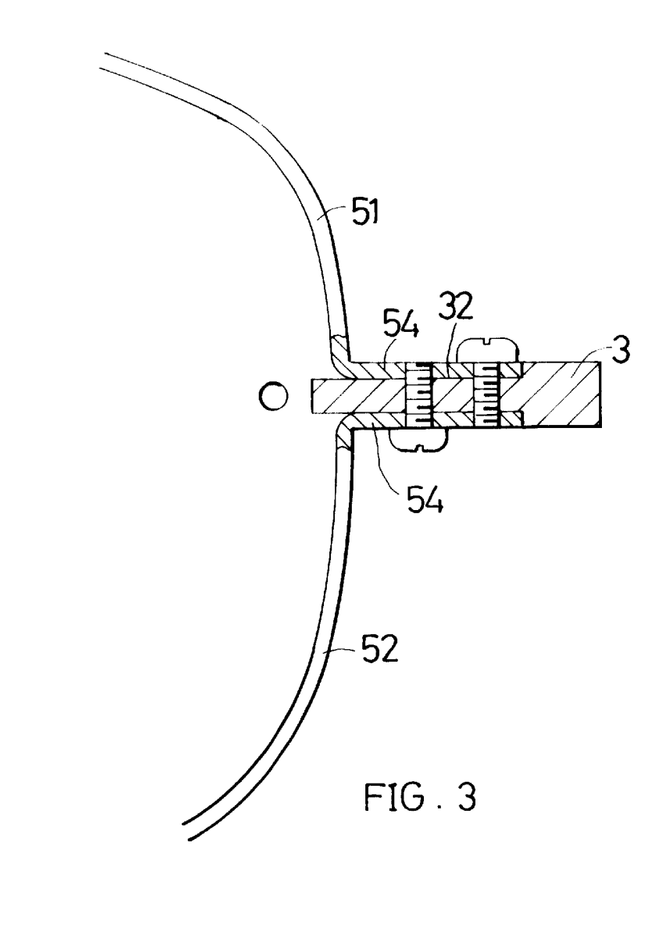
FIG. 3 is a sectional view of a part of a first embodiment of the fixing section of the present invention.
Figure 4:
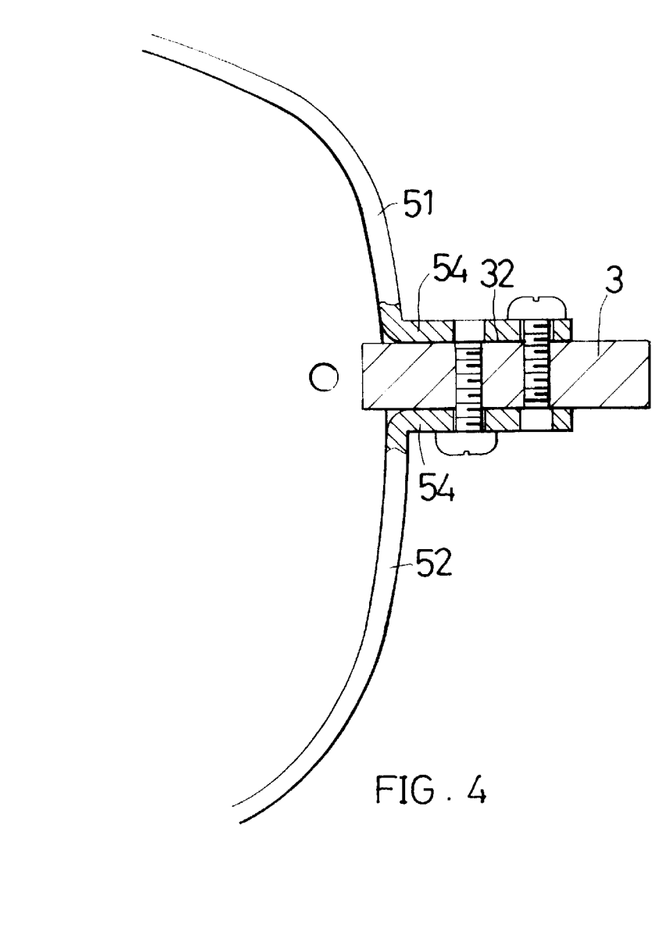
FIG. 4 is a sectional view of a part of a second embodiment of the fixing section of the present invention.

FIGS. 3 and 4 show a first and a second embodiments of the fixing section 32. The surface of the outer seat 3 can be recessed or not recessed to form the fixing section 32. In former, after the bolted section 54 of the movable rim assembly 5 is locked on the fixing section 32, the bolted section 54 will not protrude beyond the surface of the outer seat 3 so that the appearance is enhanced. The coupling section 31 of the outer seat 3 is bolted with the lens 2. In the case that the fixing section 32 of the outer seat 3 is recessed to such reduce the thickness of the outer seat 3 that the outer seat 3 cannot be sufficiently firmly coupled with the lateral side of the lens 2, the outer side of the lens 2 can be formed with a locating dent 22 for inserting the outer seat 3 therein. This avoids rotation of the outer seat 3 due to too small contacting area with the lens 2.

Figure 6:
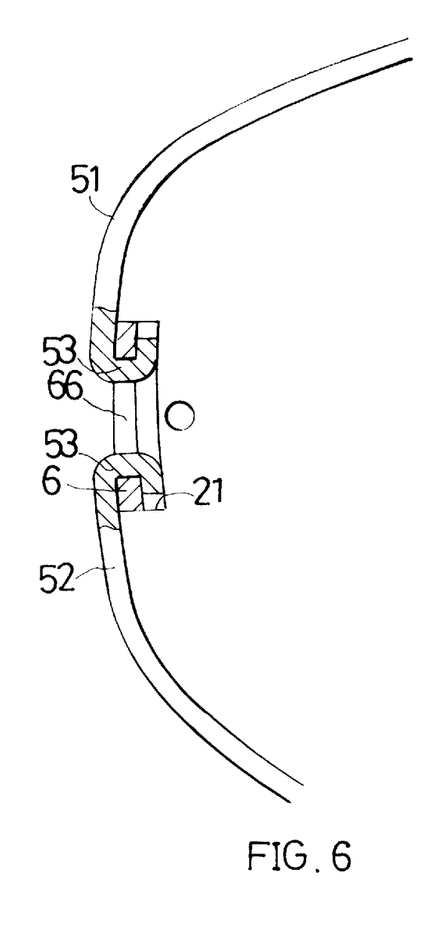
FIG. 6 is a sectional view of a part of a second embodiment of the inner seat of the present invention.

FIGS. 6 shows a second embodiment of the inner seat 6 in which the hook section 53 of the movable rim assembly 5 is inward hooked toward the lens 2. The inner seat 6 has only one stopper socket 66. The lens 2 is formed with an inward hooking cavity 21, whereby when the hook sect ion 53 is hooked into the stopper socket 66 of the inner seat 6, the hook section 53 protruding from the surface of the stopper socket 66 can be accommodated in the cavity 21. This makes the inner seat 6 more flush with the edge of the lens 2 and enhance the firmness and appearance.

Figure 10:
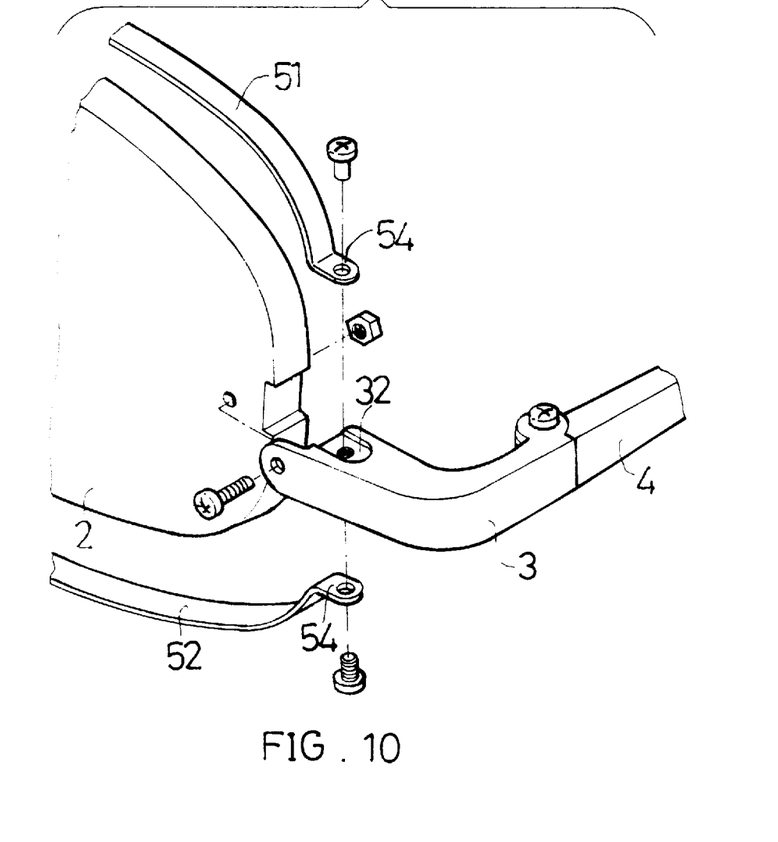
FIG. 10 is a perspective exploded view of another embodiment of the present invention.

FIG. 10 shows still another embodiment of the present invention, in which the bolted sections 54 of the upper and lower half rims 51, 52 are locked at the same position of the fixing section 32 so that the length of the bolted section 54 can be shortened to save material.

According to the above arrangement, the bolted sections 54 of the upper and lower half rims 51, 52 are directly locked with the outer seat 3 without the conventional stopper plate so that the spectacles can be easily converted between full rim, rimless and half rim-type spectacles. Furthermore, the bridge 7 is excellently located on the inner seat 6 so that the number of the components is reduced and the appearance is enhanced. Also, the replacing procedure is simplified and the cost is lowered.

The above embodiments are only used to illustrate the present invention, not intended to limit the scope thereof. Many modifications of the above embodiments can be made without departing from the spirit of the present invention.

What is claimed is:

1. A spectacles structure comprising two outer seats, two movable rim assemblies, two inner seats and a bridge disposed between the two movable rim assemblies, wherein:

a front side of each outer seat has an extending coupling section for bolting on outer side of lens, a top face and a bottom face of the outer seat being respectively formed with two fixing sections;

the inner seat has a coupling section extending to one side and bolted on inner side of the lens, the other side of the inner seat being formed with at least one stopper socket;

the movable rim assembly includes an upper half rim and a lower half rim, one end of each of the upper and lower half rims being formed with a hook section, the other end thereof being formed with a bolted section, the hook section being hooked in the stopper socket of the inner seat, the bolted section being bolted with the fixing section of the outer seat.

2. A spectacles structure as claimed in claim 1, wherein the coupling section of the inner seat is formed with a projection having a notch, two ends of the bridge being respectively formed with two locating sections cooperating with the projections of the inner seats, the notch of the inner seat permitting the locating section to be placed into the projection, one end of the notch abutting against the bridge and an upper edge of the coupling section contacting with a lower edge of the bridge, that is, abutting against one side of the bridge opposite to the side against which the notch abuts, whereby the bridge is prevented from rotating relative to the inner seat, the coupling section and the locating section are locked without relative linear displacement.

3. A spectacles structure as claimed in claim 1, wherein a surface of the outer seat is recessed to form the fixing section, whereby after the bolted section of the movable rim assembly is locked on the fixing section, the bolted section will not protrude beyond the surface of the outer seat.

4. A spectacles structure as claimed in claim 1, wherein the hook section is hooked in the stopper socket inward toward the lens, the lens being formed with an inward hooking cavity in which the hook section is accommodated.

5. A spectacles structure as claimed in claim 1, wherein the inner seat is formed with a longitudinal channel.

6. A spectacles structure as claimed in claim 1, wherein the inner seat is formed with a protuberance.

* * * * *